(12) United States Patent
Loveless

(10) Patent No.: US 11,682,078 B2
(45) Date of Patent: *Jun. 20, 2023

(54) TRADING BASED ON FILL RATE

(71) Applicant: CFPH, LLC, New York, NY (US)

(72) Inventor: Jacob Loveless, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,641

(22) Filed: Jul. 18, 2022

(65) Prior Publication Data

US 2022/0351291 A1    Nov. 3, 2022

Related U.S. Application Data

(63) Continuation of application No. 16/526,370, filed on Jul. 30, 2019, now Pat. No. 11,393,028, which is a continuation of application No. 14/459,267, filed on Aug. 13, 2014, now Pat. No. 10,402,903, which is a continuation-in-part of application No. 14/348,919, filed as application No. PCT/US2014/032433 on Mar. 31, 2014, now abandoned.

(60) Provisional application No. 61/901,438, filed on Nov. 7, 2013, provisional application No. 61/901,438, filed on Nov. 7, 2013.

(51) Int. Cl.
    *G06Q 40/00* (2023.01)
    *G06Q 40/04* (2012.01)
(52) U.S. Cl.
    CPC .................................. *G06Q 40/04* (2013.01)
(58) Field of Classification Search
    CPC ....... G06Q 40/00; G06Q 40/04; G06Q 10/047
    See application file for complete search history.

(56) References Cited

U.S. PATENT DOCUMENTS

| 6,493,682 | B1* | 12/2002 | Horrigan | ................ | G06Q 40/00 |
| | | | | | 705/37 |
| 2007/0174176 | A1* | 7/2007 | Brucato | ................ | G06Q 40/04 |
| | | | | | 705/37 |
| 2010/0332650 | A1* | 12/2010 | Aisen | .................. | H04L 43/0852 |
| | | | | | 709/224 |
| 2011/0191229 | A1* | 8/2011 | Mittal | .................... | G06Q 40/00 |
| | | | | | 705/37 |

OTHER PUBLICATIONS

Maglaras, Costis (Optimal Order Routing in a Fragmented Market. Graduate School of Business, Columbia University. https://www8.gsb.columbia.edu/sites/financialstudies/files/files/Maglaras%20-%20multilob-2012-05.pdf. May 21, 2012) (Year: 2012).*

* cited by examiner

*Primary Examiner* — Mike Anderson
*Assistant Examiner* — Mark H Gaw

(57) ABSTRACT

According to various embodiments, trades may be filled based at in part on order price and fill rates determined for providers of orders. In some embodiments, orders at a given price in an order book may be ordered in order of decreasing fill rate, such that orders associated with a higher fill rate (or higher probability of fill) are preferred above orders associated with a lower fill rate. In some embodiments, order books may also be ordered based in part on response times from order providers. For example, orders in an order book may be ordered according to an algorithm that preferences higher fill rates and shorter response times ahead of orders with lower fill rates and longer response times. Order book ordering algorithms may also consider order quantity and interdependence and duplication of order quantity.

20 Claims, 4 Drawing Sheets

TRADING BASED ON FILL RATE

CROSS REFERENCE TO RELATED APPLICATIONS

This application is a continuation of U.S. patent application Ser. No. 16/526,370 filed Jul. 30, 2019, which is a continuation of U.S. patent application Ser. No. 14/459,267 filed Aug. 13, 2014, which is a continuation-in-part of U.S. patent application Ser. No. 14/348,919 filed Apr. 1, 2014, which is a national stage application of PCT International Application No. PCT/US/2014/032433 filed Mar. 31, 2014, which claims the benefit of U.S. provisional application No. 61/901,438 filed Nov. 7, 2013, the disclosures of which are hereby incorporated by reference herein in their entireties.

FIELD

Some embodiments relate to matching and/or trading items.

BACKGROUND

Systems may be used for the electronic matching and/or trading of items between users.

SUMMARY

According to various exemplary embodiments, an apparatus may comprise at least one processor associated with a workstation of a specific trader and at least one memory having instructions stored thereon which, when executed by the at least one processor, further direct the at least one processor to perform various actions. The instructions may direct the at least one processor to receive a first order for an item, the first order associated with a first fill rate and a first response time. The instructions may direct the at least one processor to, after receiving the first order, receive a second order for the item associated with a second fill rate and a second response time. The instructions may direct the at least one processor to order, in an order book of the specific trader, the second order ahead of the first order based at least in part on the first fill rate and first response time associated with the first order and the first fill rate and first response time of the second order. The instructions may direct the at least one processor to, responsive to ordering the second order ahead of the first order in the order book, cause an order of the specific trader to be executed against the second order before any executing of any order of the specific trader against the first order.

In some embodiments, the act of receiving the first order may comprise receiving the first fill rate. In some embodiments, the act of receiving the second order may comprise receiving the second fill rate.

In some embodiments, the first fill rate may be determined based on a number of times orders routed to a provider of the first order were filled by the provider of the first order compared to a number of times orders routed to the provider of the first order were not filled by the provider of the first order.

In some embodiments, the first fill rate may be determined based on a number of times orders for the item routed to a provider of the first order were filled by the provider of the first order compared to a number of times orders for the item routed to the provider of the first order were not filled by the provider of the first order.

In some embodiments, the first fill rate may be determined based on a total quantity routed to a provider of the first order that was filled by the provider of the first order compared to a total quantity routed to the provider of the first order that was not filled by the provider of the first order.

In some embodiments, the first fill rate may be determined based on a total quantity of the item routed to a provider of the first order that was filled by the provider of the first order compared to a total quantity of the item routed to the provider of the first order that was not filled by the provider of the first order.

In some embodiments, the first fill rate may be determined based on a number of times orders for the item of a particular quantity range routed to a provider of the first order were filled by the provider of the first order compared to a number of times orders for the item of the particular quantity range routed to the provider of the first order were not filled by the provider of the first order.

In some embodiments, the second order may be associated with a first response time; and the instructions may further direct the at least one processor to: before receiving the second order, receive by the at least one server a third order for the item from a third user, the third order having a price equal to the price of the second order, the third order associated with a second response time that is longer than the first response time; and order by at least one server in the order book the second order ahead of the third order based at least in part on the second response time associated with the third order being longer than the first response time associated with the second order, wherein the act of communicating by at least one server the trading command to the second user occurs before communicating by the at least one server any trading command concerning the item to the third user, and wherein the act of communicating is responsive to ordering in the order book the second order ahead of the third order.

In some embodiments, the instructions, when executed by the at least one processor, may further direct the at least one processor to: receive a third order and a fourth order; determine a probability that at least a portion of the third order is not independent of at least a portion of the first order; and order the third order and the fourth order in the order book based at least in part on the determined probability that at least a portion of the third order is not independent of at least a portion of the first order.

In some embodiments, the first fill rate may comprise a probability of fill per unit time, and the second fill rate may comprise a probability of fill per unit time.

Corresponding methods and machine-readable media are also contemplated herein for above embodiments.

According to an exemplary embodiment, a method may include: receiving a first order and a second order for an item, wherein: the first order is associated with a first user and the second order is associated with a second user, the first and second orders have the same price associated therewith, the first order is received in time before the second order, a fill rate is associated with the first order, and a fill rate is associated with the second order; receiving a command to buy or sell the item, wherein the command has a threshold associated therewith; determining that the fill rate associated with the first order is less than the threshold; as result of determining that the fill rate associated with the first order is less than the threshold, disregarding the first order and comparing the fill rate associated with the second order to the threshold; determining that the fill rate associated with the second order is greater than or equal to the threshold; as result of determining that that the fill rate associated with the second order is greater than or equal to the threshold, communicating the trading command to the second user; and responsive to communicating the trading command to the second user, receiving an indication that the second user wishes to trade against the trading command. Corresponding systems and machine-readable media are also contemplated herein.

According to various exemplary embodiments, a method may comprise various actions. At least one server may receive a first order and a second order for an item. The first order may be associated with a first user, and the second order may be associated with a second user. The first and second orders may have the same price associated therewith. The first order may be received in time before the second order. A first fill rate may be associated with the first order, and a second fill rate may be associated with the second order. The at least one server may receive a command to buy or sell the item. The command may have a threshold associated therewith. At least one server may determine that the first fill rate associated with the first order is less than the threshold. As result of determining that the fill rate associated with the first order is less than the threshold, the at least one server may disregard the first order and compare the fill rate associated with the second order to the threshold. The at least one server may determine that the second fill rate associated with the second order is greater than the first fill rate associated with the first order. As result of determining that that the second fill rate associated with the second order is greater than the first fill rate associated with the first order, the at least one server may communicate the trading command to the second user before communicating any trading command to the first user. Responsive to communicating the trading command to the second user, an indication that the second user wishes to trade against the trading command may be received. Corresponding systems and machine-readable media are also contemplated herein.

According to various exemplary embodiments, a method may comprise: receiving by at least one server a first order and a second order for an item, wherein: the first order is associated with a first user and the second order is associated with a second user, the first and second orders have the same price associated therewith, the first order is received in time before the second order, a first fill rate is associated with the first order, and a second fill rate is associated with the second order; receiving by at least one server a command to buy or sell the item, wherein the command has criteria associated therewith; determining by at least one server that the first fill rate associated with the first order does not satisfy the threshold; as result of determining that the first fill rate associated with the first order does not satisfy the threshold, disregarding by at least one server the first order and determining whether the second fill rate associated with the second order satisfies the criteria; determining by at least one server that the second fill rate associated with the second order satisfies the criteria; as result of determining that that the second fill rate associated with the second order satisfies the criteria, communicating by at least one server the trading command associated with the second order to the second user before communicating any trading command relating to the first order; and responsive to communicating the trading command to the second user, receiving an indication that the second user wishes to trade against the trading command. Corresponding systems and machine-readable media are also contemplated herein.

According to various embodiments, a non-transitory computer-readable medium having instructions stored thereon, when executed by at least one processor, may direct the at least one processor to perform various actions. The instructions may direct the processor to receive a first order for an item, the first order associated with a first fill rate and a first response time; The instructions may direct the processor to, after receiving the first order, receive a second order for the item associated with a second fill rate and a second response time; The instructions may direct the processor to order, in an order book of the specific trader, the second order ahead of the first order based at least in part on the first fill rate and first response time associated with the first order and the first fill rate and first response time of the second order. The instructions may direct the processor to, responsive to ordering the second order ahead of the first order in the order book, cause, by the at least one processor, an order of the specific trader to be executed against the second order before any executing of any order of the specific trader against the first order. Corresponding systems and methods are also contemplated herein.

The above advantages and features are of representative embodiments only and are presented only to assist in understanding the invention. They are not to be considered limitations on the invention as defined by the claims. Additional features and advantages of embodiments of the invention will become apparent in the following description, from the drawings, and from the claims.

DESCRIPTION

Figure 1:
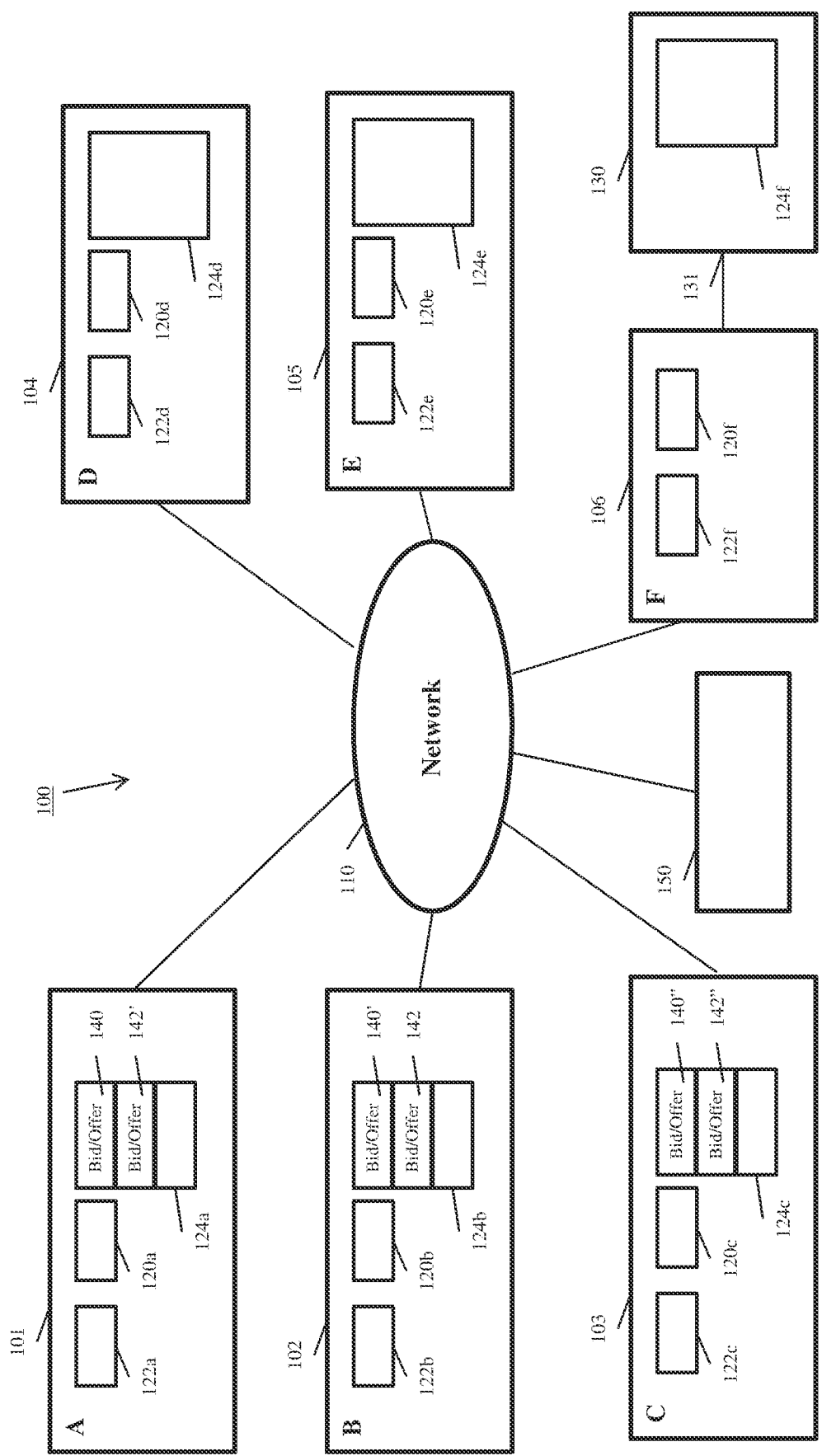
FIG. 1 shows an exemplary distributed matching engine according to some embodiments.

Referring to FIG. 1, there is shown an example system 100 according to an example embodiment. System 100 may include one or more computing systems (e.g. servers) 101-106. Computing systems 101-106 may be referred to herein as servers for purposes of description. However, it should be understood that the use of the term server is non-limiting, and that other types of computing systems may be used.

Each server 101-106 may include one or more processors and one or more memories, which may include one or more databases. Each server may include one or more network hardware/software/firmware based interfaces that enable the server to connect to and communicate over network 110. Network 110 may include a public and/or private network(s) and be a wired and/or wireless network based on any type of technology. Network 110 may also include a bus and/or backplane type architecture. Network 110 may include one or more elements including routers, switches, etc. Network 110 may be configured to allow at least each of servers 101-106 to communicate with the other. Network 110 may also be configured to allow servers 101-106 to communicate with other computing systems (e.g., computing system 150) that may be on network 110 or may be on other networks not shown in FIG. 1 but are accessible via network 110. As one example, network 110 may be a private network that is interfaced to, via one or more routers/switches/etc. for example, one or more other private and/or public networks thereby allowing, for example, any one of servers 101-106 to communicate with other computing systems on such networks. One or more of servers 101-106 and network 110 may be configured to support unicast, broadcast, and/or multicast communications. The multicast communications may include IP multicasting, although other types of multicasting may be used. The multicasting may be reliable or unreliable multicasting. One skilled in the art will recognize that the above description of servers 101-106 and network 110 are merely examples, and that additional and/or other server/network configurations and functionality may be used. For example, in addition to network 110, one or more of servers 101-106 may also include one or more additional network hardware/software/firmware based interfaces that enable the server to connect to and communicate over one or more other public and/or private networks not shown in FIG. 1.

One or more of servers 101-106 within system 100 may be identically configured and/or substantially identically configured in terms of hardware (e.g., processor configuration, number of processors, processor speed, memory size, memory speed, etc.) and/or system software (e.g., operating system) and/or network interface(s) speed. Similarly, one or more of server's 101-106 ability to communicate with any other server over network 110 may be the same. One or more of servers 101-106 may be co-located within the same rack, room, building, etc. In addition, the network elements that make up network 110 may also be co-located with servers 101-106. Again, additional and/or other configurations are possible. For example, each server may have different performance capabilities.

System 100 may be referred to as cloud computing system. System 100 may be owned by and/or partially owned by and/or maintained/operated by one or more entities that lease or rent the resources of system 100 to one or more other users/customers, such as users A-F. Users A-F may be individual people and/or companies, such as banks, investments funds, trading firms, etc. Alternatively and/or in addition, one or more of users A-F may own resources of system 100. As an example, server 101 may be leased to or owned by user A, server 102 may be leased to or owned by user B, server 103 may be leased to or owned by user C, server 104 may be leased to or owned by user D, server 105 may be leased to or owned by user E, and/or server 106 be leased to or owned by user F. In general, each server 101-106 may be assigned to a particular user who has access to the resources of that server. A given user may be associated with/lease/own multiple servers within system 100. According to one example, system 100 may be expandable in that additional servers may be added to the system, which servers may be leased to or owned by uses A-F and/or new users. System 100 may be configured such that the addition and/or removal of one or more servers may not affect other users. As another example, a given server may be leased/rented to multiple different users that have no association with one another. The server may be configured such that use of the server by one of the users does not affect the other user, and vice versa.

According to one example, system 100 may operate as and/or be configured as a trading or matching system and in particular, a distributed trading/matching system, that allows users, such as users A-F, to trade and/or buy-sell one or more items with one another. The item(s) traded on system 100 may be owned by one or more of the users A-F of the system. Alternatively and/or in addition, one or more of users A-F may be principals and/or brokers and/or agents, for example, acting on behalf of an entity(s) that may own the item(s). The traded items may include tangible and/or intangible items. According to one example, system 100 may be configured to trade one or more financial instruments, including for example, fixed income securities, equities, foreign exchange, etc. Accordingly, each user A-F may use system 100 to trade one or more financial instruments with one or more other users of the system. One skilled in the art will recognize that other types of items may be traded and/or bought/sold via system 100 such as, for example, real-estate (e.g., property, homes, and/or buildings), consumer products (e.g., cars, electronics), tickets (e.g., airline, concert), etc. One skilled in the art will recognize that in addition to and/or as an alternative to a trading or matching system, system 100 may operate as/be configured as other type(s) of systems.

One or more of servers 101-106 may also include (e.g., have stored in a memory) one or more applications 120*a-f* that execute thereon. As an example, applications 120*a-f* may be referred to herein as matching engines, although other and/or additional types of applications are possible. Matching engines 120*a-f* may enable users A-F to trade buy/sell items between one another. Matching engines 120*a-f* may be software and/or firmware and/or hardware based applications that execute on servers 101-106. Each server may include one and/or multiple matching engines. Each server may include additional and/or other applications. The matching engine(s) of each server 101-106 may be the same and/or substantially the same application, or different applications. For example, each matching engine may execute a similar matching algorithm. As another example, different matching engines may execute different matching algorithms. Matching engines 120*a-f* may be developed/maintained by the entity(s) that own/operate system 100. Such entities may also develop/maintain other and/or additional applications that execute at each server.

Each server may also include one or more applications 122*a-e* (e.g., have stored in a memory) that execute thereon that are associated with users, such as users A-E. As an example, applications 122*a-e* may be referred to herein as trading applications, although other and/or additional types of applications are possible. According to another example, one or more trading application(s) (such as application 122*f*) may not execute on a server 101-105. Rather, the application may execute on a computing system, such as computing system 130, that is connected to a server, for example server 106. Computing system 130 may or may not be co-located with server 106 and/or other elements of system 100. Computing system 130 and server 106 may communicate over one or more private and/or public networks 131. As another example, computing system 130 and server 106 may communicate over network 110. According to one example, computing system 130 may be owned and operated by an entity that owns and operates system 100. According to another example, computing system 130 may be owned and operated by the user (here user F) associated with the server to which the computing system is connected. One skilled in the art will recognize that these configurations are merely examples and other and/or additional configurations are possible. For example, each server 101-105/computing system 130 may include one and/or multiple trading applications. Each server 101-105/computing system 130 may also include additional and/or other applications associated with users, such as users A-F.

According to one example, each trading application 122*a-f* may be configured to intercommunicate with respective matching engines 120*a-f* and thereby enable users A-F of system 100 to trade items. Each trading application 122*a-f* may be automated trading algorithms that executes trading strategies, and thereby generates trading orders (e.g., bids, offers, hits, takes) for example, on behalf of the respective users A-F. Each trading application(s) at a given server may be configured to trade one or more items. Each trading application 122*a-f* may be a software and/or firmware and/or hardware based application that executes on each respective server 101-105/computing system 130. Each trading application may be different from the other trading applications and may be developed by the user to which the respective server is assigned. For example, user A may develop trading application 122*a* and load/have loaded that application on server 101 (e.g., through an administration application) where the application executes. Similarly, user B may develop trading application 122*b* and load/have loaded that application on server 102 (e.g., through an administration application) where the application executes. In addition to and/or as another example, trading applications 122*a-f* may be generic applications (such as APIs) provided by the entity(s) that owns/operates system 100. In each instance, each respective user A-F may customize its respective application (e.g., through an API that the user interfaces with either through a computing system remote from the respective server, through an administration application, and/or through a user interface device (keyboard/mouse/etc.) connected to the respective server, etc.) to meet their needs. One skilled in the art will recognize that these configurations are merely examples and that other and/or additional configurations are possible. For example, rather than trading applications 122*a-f* being automated trading algorithms that execute trading strategies, one or more of trading applications 122*a-f* may allow a respective user(s) to interface with system 100 and generate orders. For example, a respective user (through a remote computing system and/or through a user interface device (keyboard/mouse/etc.) connected to a respective server, etc.) may be able to manually submit orders to a respective matching engine of a server.

As discussed, matching engines 120*a-f*, together with respective trading applications 122*a-f*, at each server may enable users A-F to trade items between one another. As one example, a single instance of a matching engine may be configured to trade one particular item (e.g., the 10yr note). Accordingly, if a given user A-F desires to trade multiple different items (e.g., the 5 and 10yr notes), the respective server may have multiple instances of matching engine 120 executing, each communicating with one or more instances of a respective trading application 122. As another example, a single instance of a matching engine may be configured to trade multiple items, the matching engine communicating with one or more instances of a respective trading application. One skilled in the art will recognize that these are merely examples and other and/or additional configurations are possible. For example, if a given server is being used by multiple different users, the server may have multiple instances of a matching engine configured to trade the same item, but for different users. For discussion purposes only, matching engine 120 will be described as enabling the trading of one item.

According to an example, for a given user A-F that desires to trade a given item, the matching engine 120*a-f* of the respective server may maintain/be configured to maintain an order book 124*a-f* for that item on the server. As an example, a respective order book may be maintained within memory of the respective server. For example, if each of users A-E desires to trade a given item, each server 101-105 may have an order book 124*a-e* for that item. Server 106 may not have an order book for that item if user F does not desire to trade that item. In this fashion, an order book for a given item may be distributed or decentralized across multiple servers. Similarly, if each of users A-E also desires to trade a second item, the matching engine(s) 120*a-e* of the respective servers 101-105 may also maintain a second order book for the second item on the server. One skilled in the art will recognize that additional and/or other order book configurations are possible.

According to a further example, for each item that may be traded over system 100, that item may be assigned a port (e.g., an Internet Protocol (IP) port) or channel, etc. on network 100. For example, a first item may be assigned port "x" and a second item may be assigned port "y", etc. As further discussed herein, a portion or all communications between servers 101-106 over network 110 regarding the first item may occur via port "x" and similarly, a portion or all communications between servers 101-106 over network 110 regarding the second item may occur via port "y". According to a further example, if a given user, say A, desires to trade the first item and the second item, server 101/matching engine(s) 120*a* may be configured to send and/or receive (and/or listen for, monitor, etc.) messages/commands/information/data on ports "x" and "y". In this fashion, user A (e.g., through trading application 122*a*) may send/receive information/data regarding the two items. Similarly, for example, if user A desires to trade the first item but not the second item, server 101/matching engine(s) 120*a* may be configured to send and/or receive (and/or listen for, monitor, etc.) messages/commands/information/data on port "x" but not on port "y". In this fashion, for example, server 101/user A may choose not to receive messages/commands/information/data on the second item to which it has no concern. Similarly, if user A (e.g., through trading application 122*a*) later has a desire to receive information on the second item, server 101/matching engine(s) 120*a* may be configured to send and/or receive (and/or listen for, monitor, etc.) messages on port "y". According to one example, trading applications 122*a-f* (possibly through user control) may determine which items are be traded and/or not be traded and in this fashion, control the configuration of a respective server/matching engine(s) as to, for example, which port(s) are monitored, and for which items an order book is maintained. As another example, a user (e.g., through an API that the user interfaces with either through a computing system remote from the respective server, through an administration application, and/or through a user interface device (keyboard/mouse/etc.) connected to the respective server, etc.) may control the configuration of a respective server/matching engine(s) as to, for example, which port(s) are monitored and for which items an order book is maintained.

According to an example operation of system 100, if a user/trading application, such as user A/trading application 122*a*, is interested in trading a given item, say item "w", user A/trading application 122*a* may generate a bid order or an offer order for item "w" (which order may include a price and/or size). Trading application 122*a* may forward the order to matching engine 120*a*, which may place the order in order book 124*a* (i.e., the order book at server 101 for item "w"). This order is shown in FIG. 1 as order 140 in order book 124*a*. According to an example operation of system 100, since user A generated order 140, matching engine 120*a* may be responsible for controlling execution of orders against order 140 (e.g., matching contra-orders against order 140). According to a further example operation of system 100, matching engine 120*a* may also multicast order 140 via network 110 over the port assigned to item "w". The multicasted order may include some designation that it originated from user A/trading application 122a/matching engine 120a and/or server 101. For each other user/server on system 100 that may have interest in item "w" and has thus been configured to receive on the port for that item, the respective matching engine may receive order 140 and place the order in its respective order book for that item. For example, users B/trading application 122b and user C/trading application 122c may have interest in item "w" and thus, matching engines 120b and 120c may be configured to receive order 140 and place the order into respective order books 124b and 124c (as shown by 140' and 140" in FIG. 1). Similarly, matching engines 120b and 120c may record some designation that the order originated from user A/trading application 122a/matching engine 120a/and/or server 101. Respective matching engines 120b and 120c may also forward information on order 140 to respective trading applications 122b and 122c and/or users B and C. While order 140 may be made known to users B-C/trading applications 120b-c, the origin of the order (i.e., identity of user A) may or may not be made known, depending on whether system 100 is an anonymous matching system.

Similarly, if user B/trading application 122b generates an order for item "w", trading application 122b may forward the order to matching engine 120b, which may place the order in order book 124b (i.e., the order book at server 102 for item "w"). This order is shown in FIG. 1 as order 142 in order book 124b. Since user B generated order 142, matching engine 120b may be responsible for controlling execution of orders against order 142 (e.g., matching contra-orders against order 140). Matching engine 120b may also multicast order 142 via network 110 over the port assigned to item "w". The multicasted order may include some designation that it originated from user B/trading application 122b/matching engine 120b/and/or server 102. For each other user/server on system 100 that may have interest in item "w" and has thus been configured to receive on the port for that item, the respective matching engine may receive order 142 and place the order in its respective order book for that item. For example, as discussed, since user A/trading application 122a and user C/trading application 122c has interest in item "w", matching engines 120a and 120c may receive order 142 and place the order into respective order books 124a and 124c (as shown by 142' and 142" in FIG. 1). Similarly, matching engines 120a and 120c may record some designation that the order originated from user B/trading application 122b/matching engines 120b and/or server 102. Respective matching engines 120a and 120c may also forward information on order 142 to respective trading applications 122a and 122c and/or users A and C.

According to a further example operation of system 100, if user A/trading application 122a later cancels all or a portion of order 140, it may generate a cancel command for the order, which command may be forwarded to matching engine 120a. Matching engine 120a may in turn cancel the order from its order book 124a and also may multicast the cancel command via network 110 over the port assigned to item "w". The cancel command may include some designation that it originated from user A/trading application 122a/matching engines 120a/and/or server 101 such that other servers may know to which order the cancel command refers to. For each other user/server that may have interest in item "w" and has thus been configured to receive on the port for that item, the respective matching engine may receive the cancel command and cancel the respective order from its respective order book. For example, matching engines 120b-c may receive the cancel command and cancel order 140 from order books 124b-c. Matching engines 120b-c may also notify trading applications 122b-c and/or users B and C that order 140 is no longer available.

Assuming the bid/offer order 140 from A is not canceled, user B/trading application 122b may generate a trading command/contra-order/counter-order, e.g., hit/take, against the order (which hit/take command may include a price and size) (as another example, the trading command may be a bid or offer that crosses with/matches with order 140—such as at a certain price). Trading application 122b may forwarded the trading command to matching engine 120b, which may search its order book 124b for matching orders, and which may recognize/determine that the command matches against at least order 140 from user A (matching engine 120b, recognizing that order 142 originated from user B, may not attempt to match the trading command against order 142). In response, matching engine 120b may multicast the trading command via network 110 over the port assigned to item "w". In addition to adding some designation that that this trading command originated from user B/trading application 122b/matching engine 120b/and/or server 102 for example, the trading command may be specifically tagged for/designated for/directed to user A/trading application 122a/server 101/and/or matching engine 120a, since, as noted, matching engine 120a may be responsible for executing against orders that originate from user A/server 101. One skilled in the art will recognize that other means may be used to notify matching engine 120a that the trading command is against an order for which matching engine 120a may be responsible for executing against. According to one example operation of system 100, other servers/matching engines may receive the multicasted trading command (e.g., those listening on the port assigned to item "w") and may ignore the command recognizing the command was designated for user A/trading application 122a/server 101/and/or matching engine 120a. According to another example operation of system 100, such servers/matching engines may receive the multicasted trading command and provide notification of the potential trade to their respective trading applications and/or users. According to one example, the actual trading command may be encrypted.

According to a further example, if additional orders are in order book 124b not of user B and the trading command from user B/trading application 122b is of a size that exceeds order 140 and/or is thereby against these other order(s), matching engine 120b may also multicast an additional trading command(s) (tagged for the server etc. responsible for the additional order(s)) via network 110 over the port assigned to item "w". As another alternative, matching engine 120b may user the same trading command tagged for user A/trading application 122a/server 101/and/or matching engine 120a, and also tag it for the server etc. responsible for the additional order(s)). One skilled in the art will recognize other variations are possible.

Upon receiving the trading command, server 101/matching engine 120a may recognize that the command is tagged for it. Matching engine 120a may next determine if order 140 is still available (e.g., has not been canceled and/or executed against by other users; is still in order book 124a). If still available, matching engine 120a may execute the trading command against order 140 by removing order 140 from its order book 124a (or reducing the available quantity of order 140 in the order book if all of it is not executed against). Matching engine 120a may also communicate with trading application 122a and/or user A, indicating that order 140 has been executed against. Furthermore, matching engine 120a may multicast a trade confirmation message via network 110 over the port assigned to item "w". The conformation message may include an indication as to the amount of order 140 that was actually executed against. The confirmation message may be specifically tagged for user B/trading application 122b/matching engine 120b/and/or server 102. Upon receiving the confirmation message, matching engine 124b may remove order 140 (or a portion thereof) from its order book 124b and may also notify user B and/or trading application 122b of the matched order. In addition to user B, all other users/servers/matching engines that have interest in item "w" may receive the confirmation message, causing the respective matching engines to remove order 140 (or a portion thereof) from their order books. Such matching engines may also notify their respective users and/or trading applications of the matched order. Hence, matching engine 120c may remove order 140 from its order book 124c and also notify trading application 122c and/or user C. According to another and/or additional example, in addition to matching engine 120a multicasting the confirmation message, it may multicast some other command (such as cancel command) to cause other matching engines (like engine 120c) to remove order 140 from its order book. One skilled in the art will recognize that other and/or additional command sequences may be used.

As another example, if matching engine 120a determines order 140 is not still available (e.g., has been canceled and/or already executed against by other users) upon receiving the trading command from user B as discussed above, it may multicast a cancel message for order 140 and/or a message specifically designating non-confirmation of the trade and/or that the trade failed and/or that the trade did not go through, etc. (which may be specifically tagged for user B/trading application 122b/matching engine 120b/and/or server 102). Regardless, the effect of the message(s) may be for all applicable matching engines to remove order 140 from their respective order books. Again, respective trading applications and/or users may be notified by their respective matching engines that command 140 is no longer available. Trading application 122b and/or user B may be specifically notified that the trade failed.

According to another example, after matching engine 120a may determine order 140 is still available as discussed above, matching engine 120a may first communicate with trading application 122a and/or user A to determine if there is still a desire to execute against order 140. If so, matching engine 120a may proceed as discussed above with respect to generating a confirmation message, etc. As another example, trading application 122a and/or user A may indicate there is still a desire to execute against order 140 but may indicate the desire is for a size less than the available size of order 140 (i.e., less than the size requested by the trading command). Here again matching engine 120a may proceed as discussed above with respect to generating a confirmation message, etc., the message indicating for example the size of order 140 that was executed against. In the alternative, if user A and/or trading application 122a does not still have a desire to execute against order 140, matching engine 120a may remove order 140 from its order book 124a and may then proceed as discussed above with respect to generating a cancel and/or non-confirmation message, resulting in order 140 being removed from other order books. Again, respective trading applications/users at other servers may be notified by their respective matching engines that command 140 is no longer available. They may also be notified that while order 140 was pending, the respective originator of the order (i.e., user A) no longer desires to execute against the order. One skilled in the art will recognize other and/or additional message flows are possible regarding the execution against or non-execution against order 140.

According to a further aspect of the example operation discussed above, if, for example, user C/trading application 122c generates a trading command against order 140 at a substantially similar time as user B/trading application 122b as discussed herein, matching engine 120c may multicast a trading command via network 110 in similar fashion as matching engine 120b. In such an event, matching engine 120a may receive two trading commands against order 140 (one from user B and one from user C), each inevitably queued with one before the other, depending on which happens to reach server 101 first. Again, because matching engine 120a may be responsible for controlling the execution against orders that originate from user A/server 101 (here, e.g., order 140), matching engine 120a may execute order 140 against only one of user B and user C (assuming both users have attempted to execute the full size of order 140), depending on which reaches server 101 first. Matching engine 120a may send, for example, a non-confirmation against the other trading command. As another example, the trading command of one of user B and user C may be fully executed and the other only partially executed if order 140 is not of sufficient size to fill both. One skilled in the art will recognize that other variations are possible.

One skilled in the art will recognize that the above described example operation of system 100 is an example, and that other and/or additional example operations are possible. For example, an item may be assigned multiple ports or channels, etc. on network 100. For example, for a given item, one port may be used to multicast only bids for the item, another port may be used to multicast only offers for the item, another port may be used to multicast only trading commands/contra-orders/counter-orders for the item (e.g., hits/takes) (alternatively, one port may be used for hits and another for takes), another port may be used to multicast trade confirmation messages for the item (alternatively, one port may be used for trade confirmations against hits and another for trade confirmations against takes, for example), another port may be used to multicast trade non-confirmation messages for the item (alternatively, one port may be used for non-confirmations against hits and another for non-confirmations against takes, for example), another port may be used to multicast cancel messages for bids for the item, and/or another port may be used to multicast cancel messages for offers for the item, etc., including any other combination hereof, including ports for other messages. Again, other variations are possible.

According to a further example feature, system 100 may remove a need to produce drop copies. For example, in matching engine 120a generating a trade confirmation message as described herein, for example, in addition to other matching engines 120b-f possibly receiving this message and updating respective order books 124b-f, other computing system(s) (represented by computing system 150) connected to network 110 may receive these messages. These other computing systems may or may not be associated with users/customers seeking to use system 100 for trading items. For example, computing system 150 may be associated with a clearing house that may clear transactions, such as the example transaction between users A and B discussed herein.

According to a further example feature of system 100, if, for example, trading application (such as application 122e) begins to submit bids and/or offers, for example, for an item at prices that are off market and there is a need to stop trading application 122e and potentially remove those bids and offers from the market, server 105 may be taken off-line. Taking server 105 off-line may include, for example, taking the entire server off-line, shutting down/halting/suspending matching engine 120e, causing matching engine 120e/server 105 to no longer listen to/receive on/transmit over the port associated with the item, etc. (such as by a command from an administrator). Notably, each action may cause trading application 122e to no longer be able to submit orders. Similarly, because matching engine 120e is responsible for controlling the execution of trading commands against orders submitted by trading application 122e, each above noted action will cause matching engine 120e to no longer be able to do such. For example, causing matching engine 120e/server 105 to no longer listen to/receive on the port associated with the item, matching engine 120e will not receive the trading commands. One skilled in the art will recognize that these are merely examples, and other and/or additional example features of system 100 are possible.

Trading Foreign Exchange

In the trading of foreign exchange ("FX"), a market may be viewed as consisting of a plurality of users, one or more of which may be viewed as a liquidity provider ("provider(s)") and one or more of which may be viewed as a liquidity taker ("taker(s)"). One skilled in the art will recognize that a user may be both a provider and a taker. A provider may make one or more markets for one or more FX instruments by submitting or streaming one or more orders for FX instruments, such as bids and/or offers for an FX instrument, each order having for example, a price and a size. Each order may be shown to/made available to one or more takers. In response, a taker may attempt to execute against an order by submitting a buy or sell trading command, such as a take of an offer or a hit of a bid (as another example, a taker may attempt to execute against an order by submitting a bid or offer, etc.). The trading command may include a specified price and size. The size of a trading command may be the same size as the corresponding order being executed against or may be for a lesser size. In response to submitting a trading command against an order, the command may be sent/routed to the provider that submitted the order. Hereinafter, a process, which may be referred to as "second look," may take place. According to second look, rather than a trading command executing against an order if the order is still available, the provider that submitted the order may be a given a second chance to decide if they wish to still trade. In response to receiving the trading command, the provider may respond with a "done" command, for example, meaning that the provider still wishes to trade at the market made by the provider according to the submitted order. The done command may include a size, which may correspond to the size of the trading command or may be for a lesser size. The done command may result in the trading command being executed against the order, and a trade thereby being executed between the corresponding provider and taker. As another alternative, the provider may respond to the taker's trading command with a "no/not done" command, for example, meaning that the provider no longer wishes to trade at the market made by the provider as specified by the order. In this case, the trading command may not be executed against the order, and no trade may be executed between the corresponding provider and taker. As a third alternative, the provider may not respond at all to the trading command or may take too long to respond to the trading command (with either a done or not done command). Here, the taker may rescind or cancel the trading command. Assuming the trading command is rescinded before the provider responds with a done command, the trading command may not be executed against the order and no trade may be executed between the corresponding provider and taker. In the latter two cases, the taker, if desiring to still execute a trade, may need to again submit another trading command against another order.

According to an example as discussed herein, system 100 may be used for the trading of one or more foreign exchange ("FX") instruments. For example, using methods as discussed herein, a provider on system 100 (such as user A and/or trading application 122a executing on behalf of user A) may make a market for an FX instrument by submitting or streaming one or more orders, such as bids and/or offers, for the FX instrument, each order having for example, a price and a size. As discussed herein, for example, each order may be routed from a provider's server (such as server 101 of user A) to one or more other servers. Assuming a server, such as server 102 of user B, has been configured to receive orders for the FX instrument, a corresponding matching engine of server 102, such as engine 120b, may receive the order and place it into respective order book 124b. Thereafter, the matching engine may forward information on the received order to a user B and/or trading application 122b. In response to receiving the order, user B and/or trading application 122b may attempt to execute against the order (thereby becoming a taker) by submitting, for example, a trading command against the order. The trading command may include a specified price and size. As discussed herein, for example, in response to submitting a trading command against the order/the command being matched against the order, the command may be sent/routed to server 101 and to matching engine 120a. According to second look, rather than matching engine 120a executing the trading command against the order (assuming the order is still available), matching engine 120a may first communicate with trading application 122a and/or user A to determine if there is still a desire to maintain the market as specified by the order. Assuming trading application 122a and/or user A still desires to maintain the order, a done command may be communicated from the trading application 122a and/or user A to matching engine 120a, which may then execute the trading command against the order (for the size specified by the done command, for example) and may thereafter generate a confirmation message, etc. as discussed herein. In the alternative, assuming trading application 122a and/or user A does not still desire to maintain the market as specified by the order, a no/not done command may be communicated from the trading application 122a and/or user A to matching engine 120a. In turn, matching engine 120a, as discussed herein for example, may communicate a cancel message for the order and/or a message specifically designating non-confirmation of the trade and/or that the trade failed and/or that the trade did not go through, etc. As another alternative, assuming trading application 122a and/or user A does not still desire to maintain the market as specified by the order, trading application 122a and/or user A may not communicate any message to matching engine 120a. As a still further alternative, user B/trading application 122b may rescind the trading command, communicating such a request with matching engine 120b for example, which may in turn communicate the rescind request to at least server 101 and matching engine 120a for example, which in turn may disregard further action regarding the trading command. One skilled in the art will recognize that the above described example operation of system 100 with respect to trading foreign exchange is an example, and that other and/or additional example operations are possible.

According to another example as discussed herein, assume, for example, that three providers, such users A, C, and D each submit an order for an instrument at the same price, for example, with A's order having a size of 10, C's order having a size of 5, and D's order having a size of 5. Assume further that each order is routed to server 102 of user B and placed into order book 124b as discussed herein. Assume further, for example, A's order has time priority of C's order, and that C's order has time priority over D's order. In response to receiving the orders, user B and/or trading application 122b may submit a trading command for the instrument at the price of the three orders and for a size of 20. According to an example as discussed herein, matching engine 120b may forward a trading command to server 101/matching engine 120a for a size of 5 (thereby executing against A's order), may forward another trading command to server 103/matching engine 120c for a size of 10 (thereby executing against C's order), and may forward a third trading command to server 104/matching engine 120d for a size of 5 (thereby executing against D's order). Matching engine 120b may forward the three trading commands substantially at the same time. For example, matching engine 120b may not wait for a confirmation or non-confirmation message from server 101 of user A before forwarding the trading commands to each of servers 103 and 104 of users C and D. According to another example, assuming user A responds with a done command but for a size less than 10 or responds with a not command, upon receiving notification from server 101 of such responses, matching engine 120b of server 102 may automatically attempt to still fill user B's trading command by forwarding another trading command to user C or user D for the unfilled size. As another alternative, matching engine 120b of server 102 may automatically attempt to still fill user B's trading command by forwarding another trading command to each of user C and user D for a respective portion of the unfilled size. As another example, assume that in addition to the orders from user's A, C, and D there is another order from user E for size 10. Here, rather than (or in addition to) matching engine 120b attempting to fill user B's trading command through user C and/or D, matching engine 120b may automatically attempt to fill user B's trading command by forwarding another trading command to user E for the unfilled size or a portion thereof. Again, one skilled in the art will recognize that the above is an example operation of system 100 and other variations are possible.

From the perspective of a taker, it is undesirable to have a provider respond to a trading command with a not done command, or to have the provider take too long to respond to a trading command or not respond at all—both possibly resulting in the taker rescinding the trading command. In these cases, the result is the taker not executing a desired trade or such a trade taking too long as the taker seeks out other providers to trade with by executing against other orders.

According to an example, a given provider's responses of done and not done commands, and/or no responses and/or delayed responses may be measured to determine for the provider a fill rate. A fill rate for a provider may be viewed, for example, as a number of trading commands sent to the provider that the provider accepts and result in an executed trade—verses a total number of trading commands sent to the provider that the provider has the ability to accept. A fill rate may be determined, for example, by measuring a number of trading commands sent to the provider that the provider accepts and result in an executed trade divided by a total number of trading commands sent to the provider that the provider has the ability to accept. The resulting value may be a value from 0 to 1, including 0 and 1, and may be expressed as a percentage value (i.e., multiplied by 100). For example, if ten trading commands are sent to a provider and the provider responds to all ten trading commands with a done command that each result in an executed trade, the provider may have a fill rate of 100%. As another example, if ten trading commands are sent to a provider and the provider responds to seven trading commands with a done command that each result in an executed trade and responds to three trading commands with a not done command, the provider may have a fill rate of 70%. As another example, if ten trading commands are sent to a provider and the provider responds to three trading commands with a done command that each results in an executed trade, responds to four trading commands with a not done command, never responds to another trading command, and responds to another trading command with a done command but takes too long and does so after the taker submits a rescind command, the provider may have a fill rate of 30% (because only three of the ten the trading commands result in an executed trade). As another example, if a trading command against an order is sent to the provider and the order is canceled by the provider and/or executed against prior to receipt of the trading command, such an unexecuted trading command may not negatively affect a provider's determined fill rate. One skilled in the art will recognize that a fill rate may be defined and determined in other manners.

According to another and/or additional example, a fill rate may be determined and updated for a provider, regardless of time, such that a provider's full history of responses to trading commands are taken into consideration. According to another and/or additional example, a fill rate may be determined and updated for a provider over a specified duration of time, such as a specified hour(s), a specified day(s), etc. For example, the duration may be the prior day of trading over which a market is open. Hence, a fill rate may be determined/updated at the end of each trading day, considering for example only a provider's responses to trading commands for that day. As another example, the duration of time may be measured over a moving duration of time, such as the last x hours. Hence, a fill rate may be determined/updated on each hour, considering trading commands of the last x hours. One skilled in the art will recognize that a fill rate may be defined and determined in additional and/or different fashions discussed herein. For example, if a provider responds to trading command with done but for a size less than the size specified by the trading command, this partial fill may negatively affect the fill rate, or in other words, cause the fill rate to a be a value less than if the done had been for the same size as the size specified by the trading command. In a given market, each provider may have its fill rate determined in the same manner or different providers may each have their respective fill rates determined in different manners. One skilled in the art will recognize that other variations are possible.

According to another and/or additional example, fill rates may be determined based on quantity filled compared to quantity not filled, e.g., in a given time period, e.g., for a given trading product. Relevant time periods may comprise historical time periods (e.g., the past two trading weeks) and also may include response times (e.g., the percentage of an order typically filled within a number of milliseconds of the execution request). In some embodiments, the number of different orders that are filled or not filled may be irrelevant;

instead, the total quantity filled versus not filled may be relevant. For example, a trader may be calculated to have a 50% fill rate for a particular trading product if the trader filled only half of the total quantity of the trading product that was routed to the trader for execution. In this example, the calculated fill rate may be 50% even if the 50% filled represented 80% of the number of orders (e.g., which might happen if the filled orders tended to be smaller than the unfilled orders, or if the trader partially filled various orders.

According to another and/or additional example, a given provider may at a given instance have one or more fill rates. For example, a provider may have one or more determined fill rates for each FX instrument for which the provider makes markets. For example, for a given FX instrument, a provider may have a single fill rate that is based on how the provider responds to trading commands regardless of the source (i.e., taker) of the trading command. As another and/or additional example, for a given FX instrument, a provider may have multiple fill rates, one for each taker, for example, and that is based on how the provider responds to trading commands from that taker. As another and/or additional example, for a given FX instrument, a provider may have a fill rate that is based on how the provider responds to trading commands from a plurality of takers, but not all takers to which the provider responds. As another and/or additional example, a provider may have a fill rate that is determined across multiple FX instruments. One skilled in the art will recognize that other variations are possible including different providers having different numbers of determined fill rates. For example, each provider may have a single fill rate that is based on how the provider responds to trading commands regardless of the source (i.e., taker), and one or more providers may have also have a fill rate tied to specified taker.

According to another and/or additional example, a fill rate(s) for a given provider may be determined manually and/or electronically. For example, referring to system 100 for example, a server, such as any of servers 101-106 for example, may monitor orders generated by a user/trading application associated with that server and may also monitor trading commands against such orders. From such measurements, the server may determine a fill rate(s). In other words, the server assigned/associated with a given provider may determine a fill rate(s) for that provider. As an example, an application executing on a server, such as a matching engine 120, may perform such measurements to determine a fill rate(s). As another and/or additional example, a server, such as any of servers 101-106 for example, may monitor trading commands generated by a user/trading application associated with that server and may also monitor orders against which such trading commands are issued and from such measurements, determine a fill rate(s). In other words, the server assigned/associated with a given taker may determine a fill rate(s) for providers. As an example, an application executing on a server, such as a matching engine 120, may perform such measurements to determine a fill rate(s). As another and/or additional example, a server of system 100 not associated with users, such as server 150, may monitor orders, trading commands, etc. and determine fill rates for providers of system 100. As another and/or additional example, any one or more servers of system 100 may monitor orders, trading commands, etc. Thereafter, an administrator, for example, may manually determine fill rates for providers of system 100. One skilled in the art will recognize that fill rates may be determined in other and/or additional manners.

According to another and/or additional example, a fill rate(s) of a given provider may be made available to other servers of system 100—in other words, servers other than and/or in addition to the server associated with a given provider. For example, if an administrator of system 100 determines fill rates, the administrator may configure/make available such fill rates to one of more servers of system 100. As another and/or additional example, if a server of system 100, such as server 150, determines fill rates, the server may communicate the fill rates to one of more servers of system 100. As another and/or additional example, if a server associated with a given provider determines a fill rate(s) for that provider, the server may communicate the fill rate(s) to one of more other servers of system 100. As one example, the fill rate(s) of a provider may be included with orders generated by that provider. One skilled in the art will recognize that fill rates may be communicated in other and/or additional manners.

According to another and/or additional example, a plurality of fill rates for a provider may be determined for a plurality of different quantities, e.g., for a particular trading product. For example, a fill rate may be determined for quantities 100 and below, between (and including) 101 and 1000, between (and including) 1001 and 5000, 5001 and 10,000, etc. This may be especially useful, for example, if a provider has a high fill rate for small quantities but a low fill rate for large quantities. For example, a provider may have a calculated fill rate of 30% for Euro-dollar quantities between 1M and 2M, but an 85% fill rate for Euro-dollar quantities between 100,000 and 500,000.

According to another and/or additional example, a fill rate may be determined based on a side of the trade, e.g., whether a provider is on the buy side or sell side for a particular item. For example, in trading a particular item, some providers may be more likely to fill an order as buyers than as sellers. Accordingly, when a provider is a buyer (or seller), the provider's fill rate may be calculated based on the number of orders (or quantity etc.) filled by the provider when that provider was a buyer (or seller) versus the number of orders (or quantity) that was not filled by the provider when the provider was a buyer (or seller).

According to another and/or additional example, a fill rate may be determined based on spread, e.g., a spread between the prices of the national best bid and offer (NBBO). For example, some traders may be more likely to fill orders when the spread satisfies a particular threshold or range, such as the spread is less than $1, or less than its average spread, or less than one standard deviation below the average spread for the trading product since the beginning of the trading day, or greater than (and/or equal to) $0.10 and less than (and/or equal to) $0.20. Accordingly, a fill rate for a particular provider may depend on the current spread on the item for which a fill rate is calculated.

In some embodiments, fill rate may be determined based on a variety of factors discussed herein, e.g., total quantity of all trading products filled versus not filled, total quantity of the specific trading product filled versus not filled, number of total orders from all sources filled versus not filled, number of orders for the specific trading product filled versus not filled, the number of orders in the same quantity range as the specific order filled versus not filled, etc. For example, the fill rate (e.g., net fill rate) may be calculated as a simple average or weighted average of two or more fill rate values calculated as discussed herein. For example, a fill rate calculated for a provider that may be used to order a specific trader's orders for a specific trading product in the specific trader's order book may be computed to be the average of (1) the provider's calculated total fill rate accounting for all trading products for all parties, (2) the provider's calculated fill rate for all trading products against the specific trader, and (3) the provider's calculated fill rate against the specific trader for a specific trading product.

In some embodiments, a fill rate may be determined based at least in part on response time. For example, a provider may be determined to have different fill rates at different response times. For example, a provider may be calculated to typically fill 70% of an average order within 10 ms, and 85% of an average order with 20 ms.

In some embodiments, fill rate may be represented as a probability of fill per unit time, reflecting both fill rate (as calculated in various examples herein) and response time.

According to another and/or additional example, when a provider's fill rate is communicated/made available to a server, the fill rate may be made known to the matching engine of that server, for example, but not made known to a trading application and/or user of that server. According to another and/or additional example, the fill rate may be made known to a trading application and/or user of the server. According to another and/or additional example, if a received order is communicated by a matching engine to a respective trading application/user, the fill rate of the provider that generated the order may also be communicated to the trading application/user.

One skilled in the art will also recognize that the determination of a fill rate as defined herein and the use thereof is not limited to a distributed architecture such as system 100. For example, the use of a fill rate(s) may also apply to a centralized order book. Here, for example, a centralized trading system (e.g., a central server that maintains the book and the receipt of orders and controls the execution of trading commands against such orders) may determine provider fill rate(s). Such a server may also communicate fill rates to computing systems used by end users.

According to another example, assume, for example, that three providers, such users A, C, and D each submit an order for an instrument at the same price, for example, with A's order having a size of 10, C's order having a size of 5, and D's order having a size of 5. Assume further that each order is routed to server 102 of user B and placed into order book 124b as discussed herein. Assume further, for example, A's order has time priority of C's order, and that C's order has time priority over D's order. Assume still further, that user A has a fill rate of 70%, that user C has a fill rate of 80%, and that user D has a fill rate of 90%. In response to receiving the orders, user B and/or trading application 122b may submit a trading command for the instrument at the price of the three orders and for a size of 10. According to an example, matching engine 120b may prioritize the orders of users A, C, and D in order book 124b based on price and then the time in which the order is submitted to the market. Hence, user A's order may be prioritized over user C's order, and user C's order may be prioritized over user D's order. Here, responsive to the trading command from user B, matching engine 120b may forward a trading command to server 101/matching engine 120a for a size of 10 (thereby executing against A's order) since user A's order has the highest priority. According to another example, matching engine 120b may prioritize the orders of users A, C, and D in order book 124b based on price and then fill rate (i.e., not time, unless two or more orders have the same price and associated fill rate). Hence, user D's order may be prioritized over user C's order, and user C's order may be prioritized over user A's order. Here, responsive to the trading command from user B, matching engine 120b may forward a trading command to server 104/matching engine 120d for a size of 5 (thereby executing against D's order) since user D's order has the highest priority. Additionally, matching engine 120b may also attempt to fill the remaining size of 5 of the trading command with user D. Alternatively, matching engine 120b may also forward a trading command to server 103/matching engine 120c for the remaining size of 5 (thereby executing against C's order) since user C's order has the next highest priority, e.g., in an order book. Again, one skilled in the art will recognize that the above is an example operation of system 100 and other variations are possible.

According to another example, assume, for example, that three providers, such users A, C, and D each submit an order for an instrument at different prices, for example, with A's order having a price better than a price of C's order, and C's order having a price better than a price of D's order (better meaning, for example, in the case of a bid a higher price and in the case of an offer a lower price). Assume further that each order is routed to server 102 of user B and placed into order book 124b as discussed herein. Assume further, for example, A's order has time priority of C's order, and that C's order has time priority over D's order. Assume still further, that user A has a fill rate of 70%, that user C has a fill rate of 80%, and that user D has a fill rate of 90%. According to example, matching engine 120b may prioritize the orders of users A, C, and D in order book 124b based on fill rate and then price (again, time may be used as an additional factor if two or more orders have the same fill rate). Hence, user D's order may be prioritized over user C's order, and user C's order may be prioritized over user A's order. According to this example, user B and/or trading application 122b may be more interested having a trading command filled than in the price(s) at which it is filled at. Hence, even if the user B and/or trading application 122b does not know the respective fill rates of the providers that originated the orders, by knowing an order is prioritized over another order of a different price may allow the user to choose what the user assumes to be a better fill rate over price.

According to another and/or additional example, orders may be ordered according to a weighted average of price and fill rate. For example, in some embodiments, a 5% difference in fill rate may be weighted the same as a $0.10 difference in price, such that one order will be ordered ahead of an order with a $0.09 worse price and a 5% better fill rate. Response time may also be a weighted consideration. In some embodiments, a specific trader may designate the weightings of various factors such as fill rate, response time, and price in the specific trader's order book, e.g., for a specific trading product. For example, the user may specify a percentage of fill rate that is equal to a price difference, e.g., that is equal to a response time. For example, for purposes of ordering a specific trader's order book, the specific trader may specify that one unit of price (i.e., a price that is better for the specific trader by one unit) is equal to 3% fill rate improvement and a 2.5 ms response time improvement. In this example, a first sell order having a price of $12.25, an associated fill rate of 80%, and an associated response time of 13 ms may be deemed equal in priority to a second sell order with a $12.26 price (one unit worse than $12.25), an associated fill rate of 86%, and an associated response time of 15.5 ms; and both orders may be ordered ahead of a third order with a price of $12.25, a response time of 80%, and a response time of 15.5 ms.

According to another and/or additional example, one or more users of system 100 may have a defined threshold that corresponds to a minimum fill rate the user desires to achieve when submitting a trading command. In other words, with respect to a user of system 100 acting as a taker, the user may define a minimum fill rate the user desires to achieve when submitting a trading command. A given user may have a single threshold that applies to all financial instruments the user wishes to trade. As another example, a given user may have multiple thresholds, one for each instrument the user wishes to trade. Different users may have different defined thresholds and a different number of defined thresholds. According to one example, a user/trading application/administrator of system 100 may configure a respective server associated with a user with that user's threshold(s)—such as configuring a respective matching engine with the threshold. According to another and/or additional example, when a user/trading application submits a trading command to a respective matching engine, the order may include a threshold. For example, if user B and/or trading application 122b submits a trading command to its matching engine 120b against an order, the trading command may include a threshold. One skilled in the art will recognize that other variations are possible.

In some embodiments, higher fill rates may be associated with worse prices and higher spreads, since counterparties are generally more likely to fill orders at prices that are more favorable to them. (For example, if the current best bid/offer for a trading product is $5.00/$5.50, a trader will be more likely to fill a bid at $5.50 than at $4.75, and a trader will be more likely to fill an offer at $5.75 than at $5.50.) Accordingly, by enabling users to specify a minimum fill rate, various embodiments enable users to express a trade-off between fill rate and price. For example, users may specify a high fill rate but typically at a worse price or may specify a lower fill rate typically at a better price.

Figure 2:
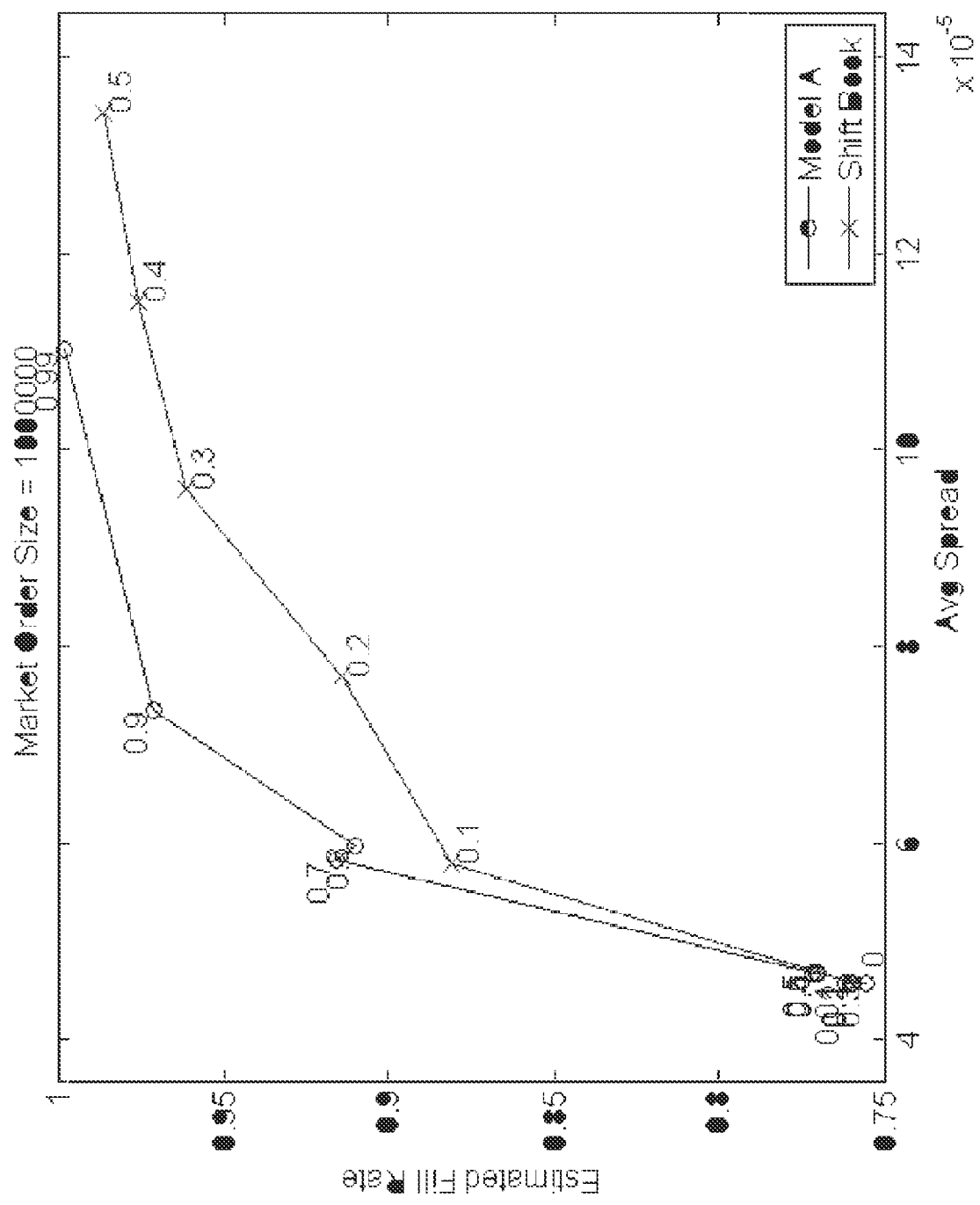
FIG. 2 depicts an exemplary graph showing estimated fill rate versus average spread according to some embodiments.
Figure 3:
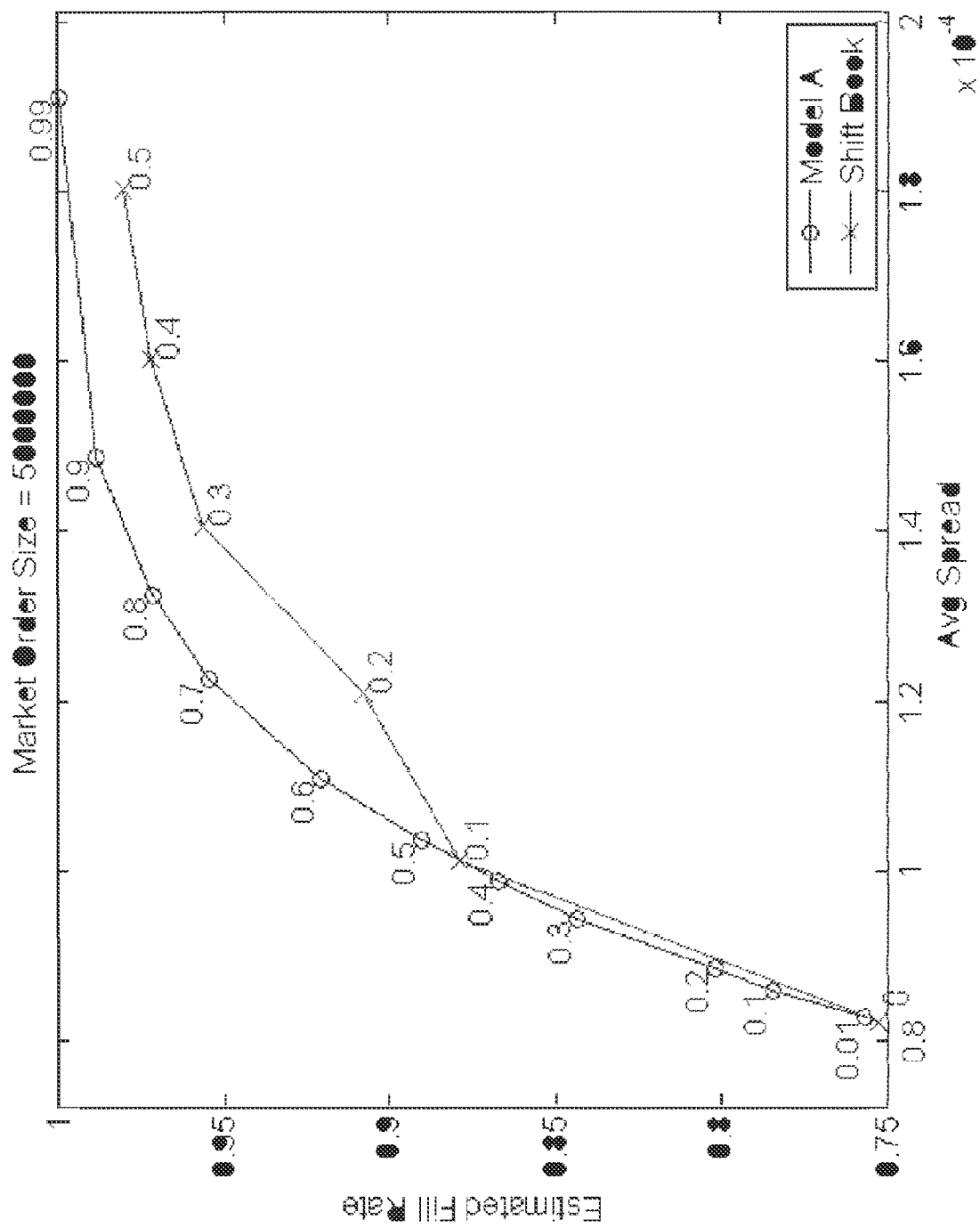
FIG. 3 depicts an exemplary graph showing estimated fill rate versus average spread according to some embodiments.

FIGS. 2 and 3 depict exemplary graphs showing estimated fill rate versus average spread according to some embodiments. FIG. 2 shows an exemplary graph where market order size is equal to 1,000,000. FIG. 3 shows an exemplary graph where market order size is 5,000,000. As shown in the graphs for both the exemplary Model A and the exemplary Shift Book, estimated fill rate tends to increase with average spread. The exemplary graphs of FIGS. 2 and 3 also depict a non-linear relationship between these variables for the data sets graphed, e.g., the estimated fill rate increases more quickly at lower spreads than it does at higher spreads.

According to another and/or additional example, when a taker (such as user B and/or trading application 122b) submits a trading command against an order in its order book 124b submitted by a provider (such as user A and/or trading application 122a), matching engine 120b, for example, may compare a defined threshold of user B against a determined fill rate of user A and communicate the trading command to server 101 of user A for potential execution of the trading command against the order only if the fill rate of user A is greater than (or greater than or equal to) the threshold of user B. Otherwise, matching engine 120b may not attempt to execute the trading command against the order. According to another and/or additional example, assume order book 124b for example has two orders, each from a different provider and each at a same price, for example, with the first order prioritized over the second based on time of being submitted to the market. Here, matching engine 120b, upon receiving a trading command from user B and/or trading application 120b, may first compare a defined threshold of user B against a determined fill rate of the provider that submitted the first order, and communicate the trading command to the server of that provider for potential execution of the trading command against the order only if the fill rate is greater than (or greater than or equal to) the threshold of user B. Otherwise, matching engine 120b may skip over/disregard the first order and compare a defined threshold of user B against a determined fill rate of the provider that submitted the second order. Again, matching engine 120b may only communicate the trading command to the server of the provider that submitted the second order for potential execution if the fill rate is greater than (or greater than or equal to) the threshold of user B. More generally, matching engine 120b, upon receiving a trading command from user B and/or trading application 120b, may skip over/disregard orders within order book 124b if the fill rate of the order is less than, for example, the defined threshold of user B. Again, the use fill rates in this manner may also apply to centralized trading system. One skilled in the art will recognize that this use of a fill rate may also apply when an order book is prioritized by price and then fill rate, or by fill rate and then price.

According to another and/or additional example, when a provider submits an order to system 100 and that order is communicated to other servers and the respective matching engines of those servers, a given matching engine may not automatically place the order into a respective order book. For example, assuming user A and/or trading application 122a submits an order to system 100, and that the order is received at server 102 of user B. As matching engine 120b receives the order the matching engine may compare a defined threshold of user B against a determined fill rate of user A. If the fill rate is greater than (or greater than or equal to) the threshold of user B, the matching engine may place the order in order book 124b (possibly forward information on the order to user and/or/trading applications 122b). In the alternative, if the fill rate is less than (or less than or equal to) the threshold of user B, the matching engine may not place the order in order book 124b (and not forward information on the order to user B and/or trading applications 122b). In this fashion, user B/trading application 124b is only presented with (and thereby has an opportunity to trade against) orders that have an associated fill rate that meets a certain threshold. The user does not see (and thereby does not have an opportunity to trade against) orders that have an associated fill rate that does not meet a defined threshold of the user. In addition, according to this example, because different users in system 100 may have different thresholds and/or may use different fill rates for respective providers, the order book at each server for a given instrument may be different (i.e., have a different current representation of the market). One skilled in the art will recognize that this use of a fill rate may also apply when an order book is prioritized by price and then fill rate, or by fill rate and then price.

According to another and/or additional example, an order book may be ordered based at least in part on response time. A response time may comprise an amount of time it takes (e.g., on average) to receive a fill or no fill response. Response times may vary between system components, times, users, etc. For example, two nodes of the system that are very close to one another may have a very low response time, while distant nodes may have a longer response time. Also, response times may increase during times of heavy network traffic. In any event, response times for fill and no-fill messages may be tracked and measured. As with fill rate, response time may be measured for various time periods and circumstances. In particular, response times may be calculated for a specific message path (e.g., response time for provider #2 to respond to trader #3, e.g., over the past three trading days), and may also be calculated for a specific trading entity (e.g., average response time for provider #2 across all fill and no-fill messages to all other trading entities).

In some cases, a trader could expect to receive multiple responses from several providers with fast response times (e.g., 0.1-1 ms) in the same time the trader might expect to get a single response from a single provider with a slower response time (e.g., 100 ms). For example, a trader attempting to fill an order for 1000 units may have the following counter orders in the trader's order book: (1) provider #1's order with a quantity of 1000, a 1 ms response time, and a 40% fill rate, (2) provider #2's order with a quantity of 1200, a 5 ms response time, and a 50% fill rate, (3) provider #3's order with a quantity of 1200, a 10 ms response time, and a fill rate of 60%, and (4) provider #3's order with a quantity of 2000, a 40 ms response time, and a fill rate of 90%. Notably, the trader could get fill or no-fill responses from provider #1, then provider #2 (if the order is not completely filled by #1), and then provider #3 (if the order is not completely filled by #1 and #2), one after the other—all in less time (16 ms) than it would take to get a response from provider #4. While order #4 may have the best fill rate, the trader is more likely to fill the order—and more quickly—by sending the order to providers #1, #2, and/or #3 (as needed).

In some embodiments, an order may be routed to the same provider multiple times. For example, an order may be routed to provider #1 multiple times before receiving a response from provider #4. While the probability of fill for a single routing to provider #1 might be calculated to be 40%, the probability of fill for routing the order to provider #1 five times may be significantly higher than 40%. One calculation might of such probability might be: Probability of fill (after 5 routes to provider #1)=$1-(1-0.4)^5=92.224\%$, which is higher than the probability of filling from provider #4 after 1 route. However, a probability of fill after multiple routes may not increase in this manner since the individual routes to the same provider may not be mathematically independent events; rather, the probability of fill from a provider may decrease each time such provider does not fill the order. These values may also be tracked and measured. For example, it may be determined that a provider whose fill rate is 50% will have a 30% fill rate on orders that were previously routed to the provider but not filled, and a 10% fill rate on orders that were rejected twice by the provider. In any event, it may be determined that the overall fill rate after several routings is higher than the fill rate for a single routing.

Thus, in some embodiments, a lower response time may be preferable to a higher fill rate (and/or to a slightly better price, or to a slightly higher quantity).

According to another and/or additional example, rejection rates (e.g., the rate at which a provider rejects an order or type of orders, in some ways the opposite of a fill rate), e.g., by liquidity providers, may be highly correlated. For example, there may be a single order behind orders from multiple liquidity providers. For example, when user A wants to buy 1000 units, liquidity providers #1, #2, and #3 may all place sell orders for 1000 units in order to acquire the units to sell to user A. While order books may reflect three separate orders for 1000 units—which appears like a total quantity of 3000 units—there is actually only 1000 units needed. Once a liquidity provider acquires the 1000 units and satisfies user A's buy order, the other sell orders for 1000 units from the other liquidity providers are likely to disappear. In this example, trader #1 may wish to buy 2000 units, and trader #1's order book may show the 1000 unit orders from liquidity providers #1, #2, and #3 at fill rates of 75%, 80%, and 90%. In this scenario, trader #1 might trade 1000 units with provider #3 and then find that provider #1 and provider #2 do not fill the remaining 1000 of the trader's order. In this case, the fill rates of provider #1 and #2 would be highly correlated.

Accordingly, in some embodiments, a probability that two (or more) orders are independent or not independent may be determined, e.g., based on information such as historical trade information (e.g., correlations between two parties cancelling all or portions of orders, e.g., after one corresponding order is filled, e.g., within a certain period of time), quantity similarity, and time similarity (e.g., entered at the same or similar time). For example, two similar-looking orders from providers A and B (e.g., similar because the orders are at the same or similar prices and quantities, e.g., entered at the same or similar time) may be determined to have a high likelihood of duplication if, in three of the last four instances where similar orders for the same product were entered from providers A and B, one of the orders was cancelled within three milliseconds of the other order being filled.

In some embodiments, rejection rates may be a function of size shown. For example, the more that providers show the same order quantity, the more likely their rejection rates will correlate. (For example, this may be because the orders are based on the same underlying quantity from a third party, and thus reflect duplicate quantity for the same underlying order.) In some embodiments, rejection rates may be a function of microstructure. Correlations in fill and rejection rates may be tracked and measured.

In some embodiments, liquidity dependence between two or more orders may be estimated, e.g., based on correlations in fill and rejection rates. For example, servers may determine, calculate, or otherwise estimate the extent to which two (or more) orders are likely to be independent of one another or duplicates (in whole or part) of one another. For example, the system may determine that two orders having completely different liquidities are likely to be independent, such that the filling of one order will not affect the quantity available in the other order, such that both orders can be hit (e.g., for their full quantities). The system may determine that another three orders are likely to be at least partial duplicates of one another, such that it is unlikely that any party can hit all three orders in their full quantities. For example, the system may determine that the three orders have 80% duplication, such that after one order is filled, the other two orders will only have 20% of their quantity still available to trade. In some embodiments, a router may detect the link state between each counter party in order to estimate liquidity dependence. In some embodiments, the system may detect Granger causation in order to estimate liquidity independence.

Figure 4:
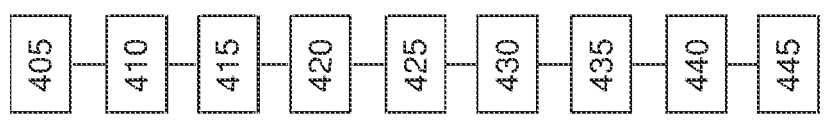
FIG. 4 depicts an exemplary flow chart according to some embodiments.

FIG. 4 depicts an exemplary flow chart according to various embodiments of the invention.

In block 405, a trader may receive orders for a trading product comprising quantity and price. The orders may comprise a specific side of a buy/sell trade; for example, the orders may comprise bids (or offers). Each order may comprise a quantity. Some orders may be received before other orders.

In block 410, information about the orders and providers of the orders may be determined, such as fill rates, response times, liquidity independence (or dependence), and other criteria. It should be appreciated that the information determined in block 210 need not be determined at any specific time, or any specific relative time compared to other blocks in the flow chart.

In block 415, the trader may receive information relating to the orders, such as the information determined in block 210. The information may comprise information about fill rates, response times, liquidity independence (or dependence), and other information.

In block 420, the trader may be prompted to submit trader preferences, such as a threshold fill rate, a threshold response time, a minimum volume requirement, and/or other trading criteria. The trader may enter criteria and/or user preferences, such as a target fill rate, threshold response time, minimum volume requirement, and/or other trading criteria, e.g., concerning a particular trading product. For example, the user may specify a minimum volume requirement of 1000 units, a minimum fill rate of 70%, and a maximum expected response time of 20 ms.

In block 425, the trader may enter a trading command, e.g., to fill a quantity of an order for the trading product, e.g., at a designated price (or at the best price). The trading command may be associated with criteria such as a target fill rate, and minimum volume requirement. The trading command may be interpreted as an instruction to fill the order according to the order book and the criteria, e.g., by filling the trader's order specifications against contra orders in the trader's order book based on the criteria (e.g., that satisfy the criteria). For example, the command may be interpreted as an instruction to fill the order in minimal time, at a good (or best) price, against contra orders that satisfy various criteria.

In block 430, one or more order instructions (e.g., requests to execute) from the trader may be routed to one or more providers of the orders, e.g., according to the trader's order book and criteria. For example, an instruction to execute one or more orders at the top of the order book may be routed to the providers of those orders. Those orders may be selected based on their price, quantity, fill rate, response time, liquidity independence, and/or other factors. One or more of the providers may be given a "second look" to determine whether to fill the requested order.

In block 435, one or more orders in the trader's order book may be executed, e.g., by one or more liquidity providers. Information about the executions may be routed to the trader, and the trader's order book (and the ordering therein) may be updated to reflect the trades. For example, an unfilled order near the top of the order book may be moved to the bottom of the order book based on a determination that liquidity filled (e.g., in block 430) is likely duplicative with quantity of the unfilled order, suggesting that the unfilled order is less likely to be executed against.

In block 440, if some of the trader's desired quantity remains unfilled, one or more order instructions (e.g., execution requests) may be routed to one or more providers of the orders according to the trader's updated order book and criteria. One or more of the orders in the updated order book may be executed in response thereto.

In block 445, information about fills, non-fills, and response time may be tracked. Such information may be used to determine and update estimates of fill rates, response times, and other information related to order books and routing.

While this disclosure has been described in terms of certain embodiments and generally associated methods, alterations and permutations of the embodiments and methods will be apparent to those skilled in the art. For example, it should be appreciated that while various features are described with reference to an FX instrument, such features may also apply to other instruments and trading products (e.g., stocks, bonds, retail products, and other products and services). Accordingly, the above description of example embodiments does not constrain this disclosure. Other changes, substitutions, and alterations are also possible without departing from the spirit and scope of this disclosure.

The following sections provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget, but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates many things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget but does not include anything else.

The term "compose" and variations thereof mean "to make up the constituent parts of, component of, or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number, and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed and does not imply that numerical methods must be used and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server, but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the Wi-Fi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel©, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back into plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. An apparatus comprising:
at least one processor associated with a workstation of a given trader, in which the at least one processor is configured to control:

receiving, over a communication network, a first order for an item from a first computer associated with a first user, the first order associated with a first fill rate and a first response time;

after receiving the first order, receiving, over the communication network, from a second computer associated with a second user, a second order for the item associated with a second fill rate and a second response time;

ordering, in an electronic database of an order book of the given trader, the second order ahead of the first order based on a first combination of at least a first weighting of the first fill rate and a second weighting of the first response time associated with the first order and a second combination of at least a third weighting of the second fill rate and a fourth weighting of the second response time associated with the second order;

executing an order of the given trader against the second order before executing any order of the given trader against the first order;

before receiving the second order, receiving, over the communication network, a third order for the item from a third computer associated with a third user, the third order associated with a third response time that is longer than the second response time; and ordering in the order book the second order ahead of the third order based at least in part on the third response time associated with the third order being longer than the second response time associated with the second order;

assigning routing of a communication of a trading message for a given item to at least one port of a plurality of ports on the communication network;

in which executing the order of the given trader against the second order includes routing a trading command for the second order to a first port of the plurality of ports of the communication network assigned for routing the item, to communicate the trading command to the second user before any trading command concerning the item is communicated to the third user, and in which the second order has a price equal to the price of the third order.

2. The apparatus of claim 1, in which the at least one processor is configured to control:
receiving first electronic signals that customize trading applications; and
generating second electronic signals that execute the trading applications customized based on the first electronic signals.

3. The apparatus of claim 1, in which the at least one processor is configured to control:
generating electronic signals for routing given execution trading messages for given orders of first given traders respectively through given assigned ports on the communications network.

4. The apparatus of claim 1, wherein the first order is received with the first fill rate, and the second order is received with the second fill rate,
wherein the first response time comprises a first value representative of an amount of time taken for filling at least a portion of a quantity by the first user who submitted the first order, and
wherein the second response time comprises a second value representative of an amount of time taken for filling at least a portion of a quantity by a second user who submitted the second order.

5. The apparatus of claim 1, wherein the first fill rate is based on a number of times orders routed to a provider of the first order were filled by the provider of the first order compared to a number of times orders routed to the provider of the first order were not filled by the provider of the first order.

6. The apparatus of claim 1, wherein the first fill rate is based on a number of times orders for the item routed to a provider of the first order were filled by the provider of the first order compared to a number of times orders for the item routed to the provider of the first order were not filled by the provider of the first order.

7. The apparatus of claim 1, wherein the first fill rate is based on a total quantity routed to a provider of the first order that was filled by the provider of the first order compared to a total quantity routed to the provider of the first order that was not filled by the provider of the first order.

8. The apparatus of claim 1, wherein the first fill rate is based on a total quantity of the item routed to a provider of the first order that was filled by the provider of the first order compared to a total quantity of the item routed to the provider of the first order that was not filled by the provider of the first order.

9. The apparatus of claim 1, wherein the first fill rate is based on a number of times orders for the item of a quantity range routed to a provider of the first order were filled by the provider of the first order compared to a number of times orders for the item of the quantity range routed to the provider of the first order were not filled by the provider of the first order.

10. The apparatus of claim 1, in which the at least one processor is configured to control:
receiving a fourth order for the item from a fourth computer;
determining a probability that at least a portion of the third order is not independent of at least a portion of the first order; and
ordering the third order and the fourth order in the order book based at least in part on the probability that at least a portion of the third order is not independent of at least a portion of the first order.

11. The apparatus of claim 1, in which the first fill rate comprises a probability of fill per unit time, and in which the second fill rate comprises a probability of fill per unit time.

12. A method comprising:
controlling, by at least one processor:
receiving, over a communication network, a first order for an item from a first computer at a first time;
receiving, over the communication network, a second order for the item from a second computer at a second time after the first time, wherein:
the first order is associated with a first user and the second order is associated with a second user,
the first and second orders have the same price associated therewith,
at the first time at which the first order is received, a first fill rate is associated with the first order, and
at the second time at which the second order is received, a second fill rate is associated with the second order;
ordering, in an electronic database of an order book, the second order ahead of the first order based on a first combination of at least a first weighting of the first fill rate and a second weighting of a first response time associated with the first order and a second combination of at least a third weighting of the second fill rate and a fourth weighting of a second response time associated with the second order; receiving, over the communication network, a command to buy or sell the item, wherein the command has criteria including fill rate criteria associated therewith;

determining that the first fill rate associated with the first order does not satisfy the criteria;

as result of determining that the first fill rate associated with the first order at the first time of receiving the first order does not satisfy the criteria, disregarding the first order and determining whether the second fill rate associated with the second order at the second time of receiving the second order satisfies the criteria;

determining that the second fill rate associated with the second order at the second time of receiving the second order satisfies the criteria;

as a result of determining that the second fill rate associated with the second order at the second time of receiving the second order satisfies the criteria, communicating, over the communication network, a trading command associated with the second order to the second user before communicating any trading command relating to the first order:

before receiving the second order, receiving, over the communication network, a third order for the item from a third computer associated with a third user, the third order having a price equal to the price of the second order, the third order associated with a third response time that is longer than the second response time;

ordering in an order book the second order ahead of the third order based at least in part on the third response time associated with the third order being longer than the second response time associated with the second order;

executing an order of a given trader associated with the order book against the second order before executing any order of the given trader against the third order;

assigning routing of a communication of a trading message for a given item to at least one port of a plurality of ports on the communication network:

in which executing the order of the given trader against the second order includes routing, over the communication network, a trading command for the second order to a first port of a plurality of ports of the communication network assigned for routing the item, to communicate the trading command to the second user before any trading command concerning the item is communicated to the third user.

13. The method of claim 12, further comprising: controlling, by the at least one processor:

receiving first electronic signals that customize trading applications;

generating second electronic signals that execute the trading applications customized based on the first electronic signals; and responsive to communicating the trading command to the second user, receiving an indication that the second user wishes to trade against the trading command.

14. The method of claim 12, further comprising: controlling, by the at least one processor:

generating electronic signals for routing given execution trading messages for given orders of first given traders respectively through given assigned ports on the communication network.

15. The method of claim 12, wherein the receiving the first order comprises receiving the first fill rate, wherein the receiving the second order comprises receiving the second fill rate, wherein the first fill rate comprises a probability of fill per unit time, wherein the second fill rate comprises a probability of fill per unit time, wherein the criteria comprises a fill rate threshold, and wherein the determining that the second fill rate satisfies the criteria comprises determining that the second fill rate is greater than the fill rate threshold.

16. The method of claim 12, wherein the first fill rate is based on a number of times orders routed to the first user were filled by the first user compared to a number of times orders routed to the first user were not filled by the first user, and wherein the criteria comprises a fill rate threshold, and wherein the determining that the first fill rate does not satisfy the criteria comprises determining that the first fill rate is less than the fill rate threshold.

17. The method of claim 12, wherein the first fill rate is based on a number of times orders for the item routed to the first user were filled by the first user compared to a number of times orders for the item routed to the first user were not filled by the first user.

18. The method of claim 12, wherein the first fill rate is based on a total quantity routed to the first user that was filled by the first user compared to a total quantity routed to the first user that was not filled by the first user.

19. The method of claim 12, wherein the first fill rate is based on a total quantity of the item routed to the first user that was filled by the first user compared to a total quantity of the item routed to the first user that was not filled by the first user.

20. A non-transitory computer-readable medium having instructions stored thereon which, when executed by at least one processor of a workstation of a given trader, control:

receiving, over a communication network, from a first computer associated with a first user, a first order for an item, the first order associated with a first fill rate and a first response time;

after receiving the first order, receiving, over the communication network, from a second computer associated with a second user, a second order for the item associated with a second fill rate and a second response time;

ordering, in an electronic database of an order book of a given trader, the second order ahead of the first order based on a first combination of a first weighting of the first fill rate and a second weighting of the first response time associated with the first order and a second combination of at least a third weighting of the second fill rate and a fourth weighting of the second response time associated with the second order;

executing an order of the given trader against the second order before executing any order of the given trader against the first order, before receiving the second order, receiving, over the communication network, a third order for the item from a third computer associated with a third user, the third order associated with a third response time that is longer than the second response time;

ordering in the order book the second order ahead of the third order based at least in part on the third response time associated with the third order being longer than the second response time associated with the second order;

assigning routing of a communication of a trading message for a given item to at least one port of a plurality of ports on the communication network;

in which executing the order of the given trader against the second order includes routing a trading command for the second order to a first port of the plurality of ports of the communication network assigned for routing the item, to communicate the trading command to the second user; before any trading command concerning the item is communicated to the third user, in which the second order has a price equal to the price of the third order.

* * * * *